United States Patent [19]

Becker et al.

[11] Patent Number: 4,608,916
[45] Date of Patent: Sep. 2, 1986

[54] BEVERAGE BREWING APPARATUS

[76] Inventors: Franklin H. Becker; Marcia R. Becker, both of 7480 NW. 35th St., Lauderhill, Fla. 33319; Dane R. Hancock, 516 Bontona Ave., Ft. Lauderdale, Fla. 33301

[21] Appl. No.: 677,926

[22] Filed: Dec. 3, 1984

[51] Int. Cl.[4] .............................................. A47J 31/00
[52] U.S. Cl. .................................. 99/283; 99/289 R; 99/299; 99/305
[58] Field of Search ...................... 99/289 R, 295, 297, 99/300, 304, 305, 280, 283, 299, 302 R; 426/433

[56] References Cited

U.S. PATENT DOCUMENTS

| | | | |
|---|---|---|---|
| 2,387,871 | 10/1945 | Baumann | 99/289 |
| 3,379,117 | 4/1968 | Richeson | 99/289 |
| 4,230,033 | 10/1980 | Cuccia | 99/289 |
| 4,468,406 | 8/1984 | Stephane | 99/283 |

Primary Examiner—Robert W. Jenkins
Attorney, Agent, or Firm—Eugene F. Malin

[57] ABSTRACT

A semi-automatic beverage brewing apparatus for brewing a cup to a pot of beverage such as coffee. The apparatus passes a selected quantity of water after heating the water, through a preselected quantity of beverage making material such as freshly ground coffee to brew the coffee. The beverage brewing apparatus includes a filter, a beverage making material holding device, a beverage making material quantity selector and transfer system for automatically measuring and placing a selected quantity of beverage making material from the material holding device into the filter, a liquid holding system, a liquid heater, a liquid quantity selector, heating and transfer system for automatically measuring, heating and placing the selected quantity of liquid on the beverage making material, and an outlet for passing the brewed liquid after it passes through the beverage making material and filter into a cup or pot.

4 Claims, 11 Drawing Figures ics = 4,608,916

BEVERAGE BREWING APPARATUS

BACKGROUND OF THE INVENTION

This invention relates to a semi-automatic beverage brewing apparatus using a selected quantity of beverage making material in the form of freshly ground coffee beans, tea, or the like, and passing a selected quantity of hot water through the beverage making material to brew a fresh cup to a fresh pot of coffee, etc.

In the past various types of beverage making and dispensing machines have been proposed, such as the beverage extracting and dispensing machine for use with coffee cartridges described in U.S. Pat. No. 4,389,925. Another coffee and tea making or brewing apparatus is disclosed in U.S. Pat. No. 4,354,427 which discloses the use of spray means for placing the hot water on the coffee. Further, many brewing devices for large quantity output have been constructed such as shown in U.S. Pat. No. 430,939. All these devices do not disclose a semi-automatic brewing apparatus for low quantity use that allow a user to have coffee from fresh ground coffee beans at a selected strength and a selected quantity.

BRIEF DESCRIPTION OF THE INVENTION

A new and improved beverage brewing apparatus for semi-automatic use that includes a housing, a filter connected to the housing, a coffee holding means, a coffee quantity selector and transfer means for measuring and placing coffee from the coffee holding means into the filter in selected quantities, a water holder, a water heater, a water quantity selector, heater and transfer means for measuring, heating and placing the water on the coffee in the filter, and an outlet for passing the brewed coffee to the cup or pot of the user. The coffee quantity selector and transfer means is connected to the housing and connected between the coffee holding means and the filter. The water quantity selector, heater and transfer means is connected to the housing and between the water holder and the filter. The water heater is connected adjacent the water holding means to heat the water dispensed out of the water holding means.

In operation, the water input or level and coffee level is checked, then the electrical power switch is turned on, the coffee quantity selector is adjusted, the start switch is engaged and the beverage brewing apparatus automatically completes a portion of the cycle. The apparatus measures the coffee and places the selected quantity in the filter, measures and heats the water and then sprays it over the coffee in the filter, and the water is brewed by moving through the coffee and filter into a cup or pot. The filter is removable for cleaning to prepare the apparatus for the next cycle.

It is an object of this invention to provide a non-complex semi-automatic ground coffee maker with a selector for the quantity of coffee and water.

Another object of this invention is to provide an improved semi-automatic coffee maker with a liquid quantity selector and heater.

In accordance with these and other objects which will be apparent hereinafter, the instant invention will now be described with particular reference to the accompanying drawings.

BRIEF DESCRIPTION OF THE INVENTION

DESCRIPTION OF THE PREFERRED EMBODIMENT

Figure 1:
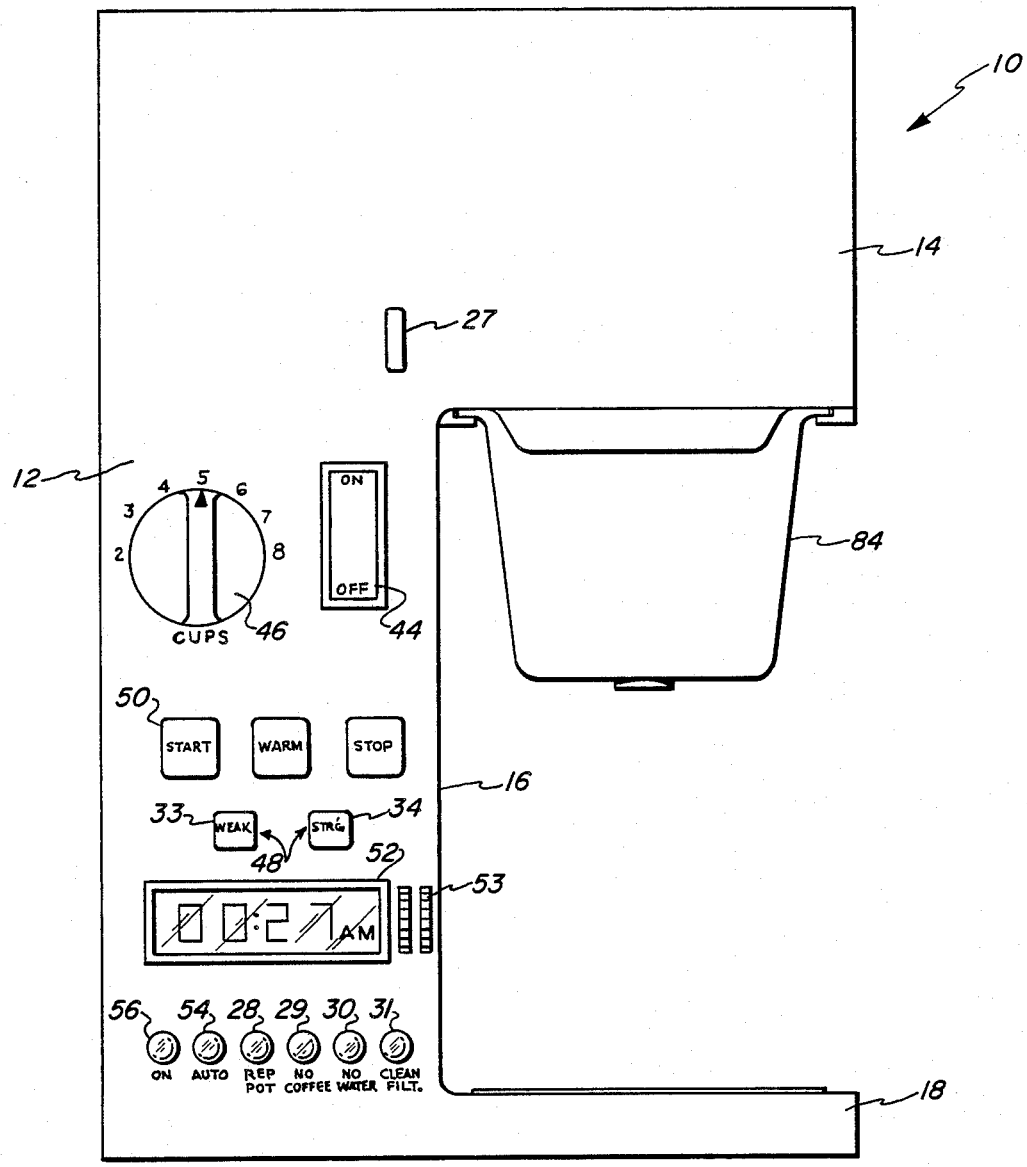
FIG. 1 is a side view of the beverage brewing apparatus.
Figure 4:
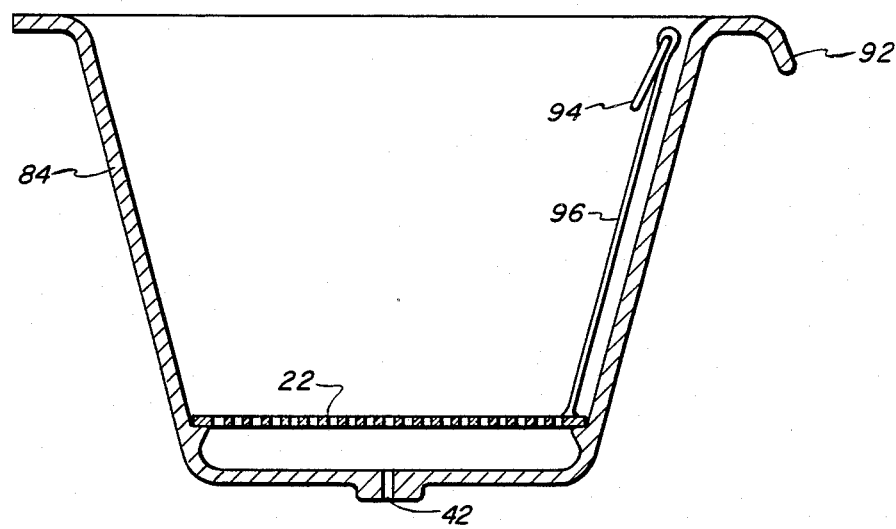
FIG. 4 is a side cross sectional view of the filter.
Figure 5:
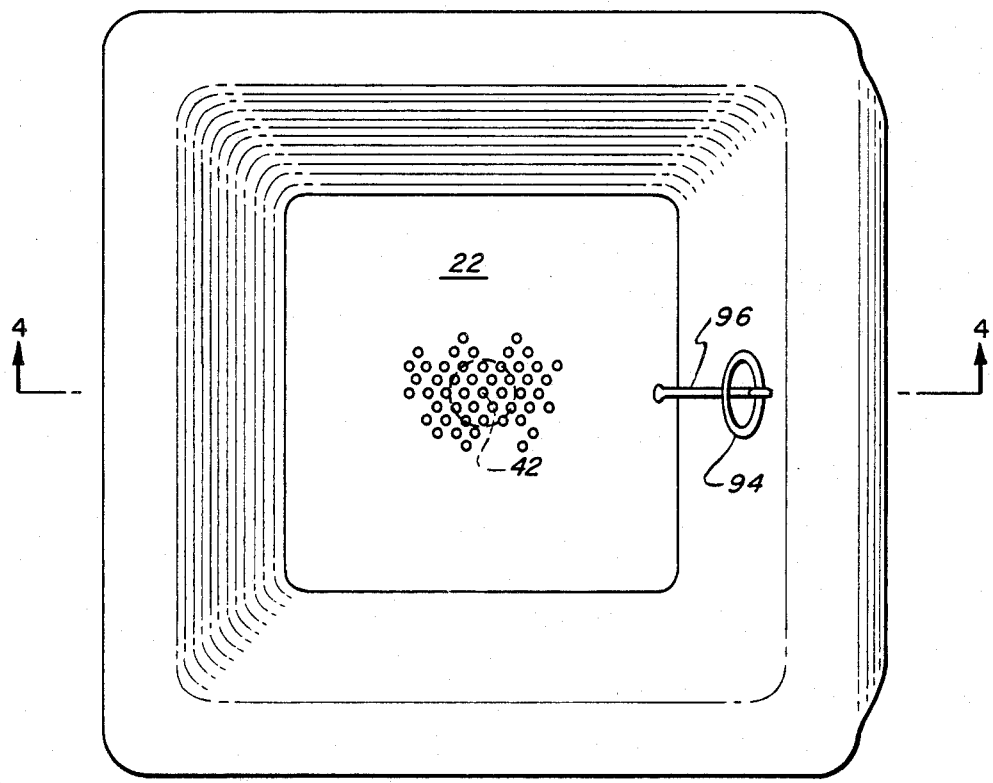
FIG. 5 is a top view of FIG. 4.

Referring now to the drawings, FIG. 1 illustrates the semi-automatic beverage brewing apparatus 10 having a housing 12 with an upper portion 14, a central portion 16 and a lower portion 18. The upper portion 14 includes the beverage making material holding means 20 shown in FIG. 2 with a filter means 22 shown in FIGS. 4 and 5 positionable in space 24 illustrated in FIG. 2. The beverage making material quantity selector and transfer means 26 is used to automatically measure and transfer a selected quantity of coffee from the material holding means 20 to the filter means 22. The material quantity selector and transfer means is connected between the material holding means 20 and the filter means 22. The liquid holding means 28 is also connected to the upper portion 14. The liquid holding means 28 is illustrated as water supply pipe 30 connected to a water supply system (not shown) or to a water tank connected to supply pipe 30. A liquid quantity selector, heating and transfer means 32 is connected in the upper portion 14. The liquid quantity selector, heating and transfer means 32 includes a solenoid operating water valve 33 and an interconnecting pipe 34 connected to movable spray head 36. The selected hot water is sprayed from nozzle 40 onto the coffee in filter means 22. An outlet 42 in the filter means 22 allows the brewed coffee to discharge into a cup or pot resting on lower portion 18 on one side of the central portion 16.

In operation the water input or level and the coffee level is checked to insure that a proper supply is available. The electrical power switch 44 in FIG. 1 is turned on to provide electrical power from A.C. source 125 to operate the system and heat the water by activating the heating means 38. The coffee and water quantity selector 46 is adjusted, the user making a selection at 48 of a desired weak or strong brewed coffee drink. The start switch 50 is engaged to automatically complete a portion of the cycle. The coffee is measured and placed by means 26 in the filter means 22. The water is then measured by the solenoid valve 33 and heated by heater 38. The hot water is sprayed over the coffee in the filter means 22. The water passes through the filter means 22 and out outlet 42 into the cup or pot.

A plurality of indicator lights may be used to indicate no coffee, no water, and used filter etc. Such items may be provided with well known circuits.

Figure 2:
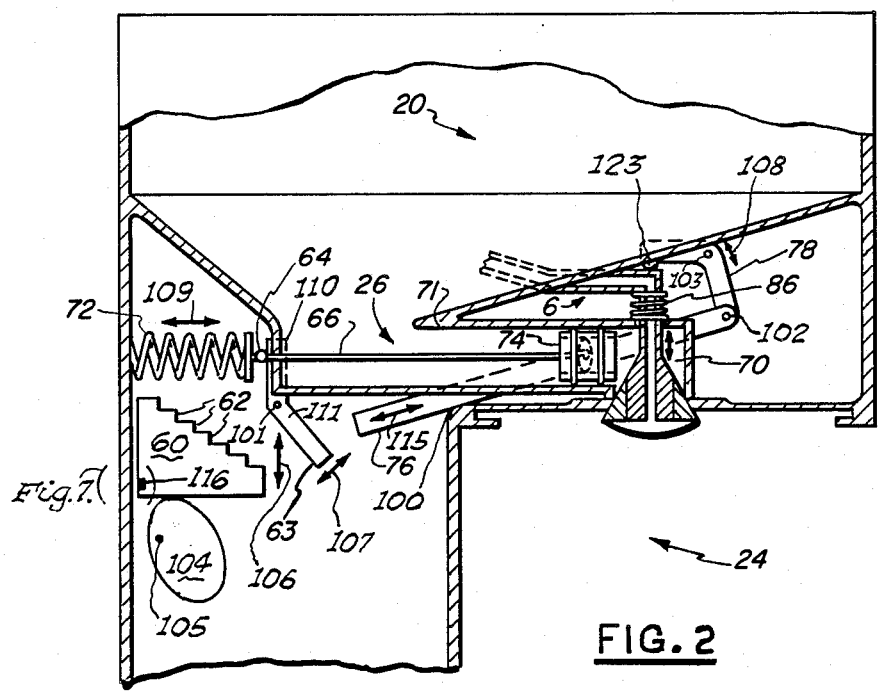
FIG. 2 is a cross section side view of the upper portion of FIG. 1.
Figure 3:
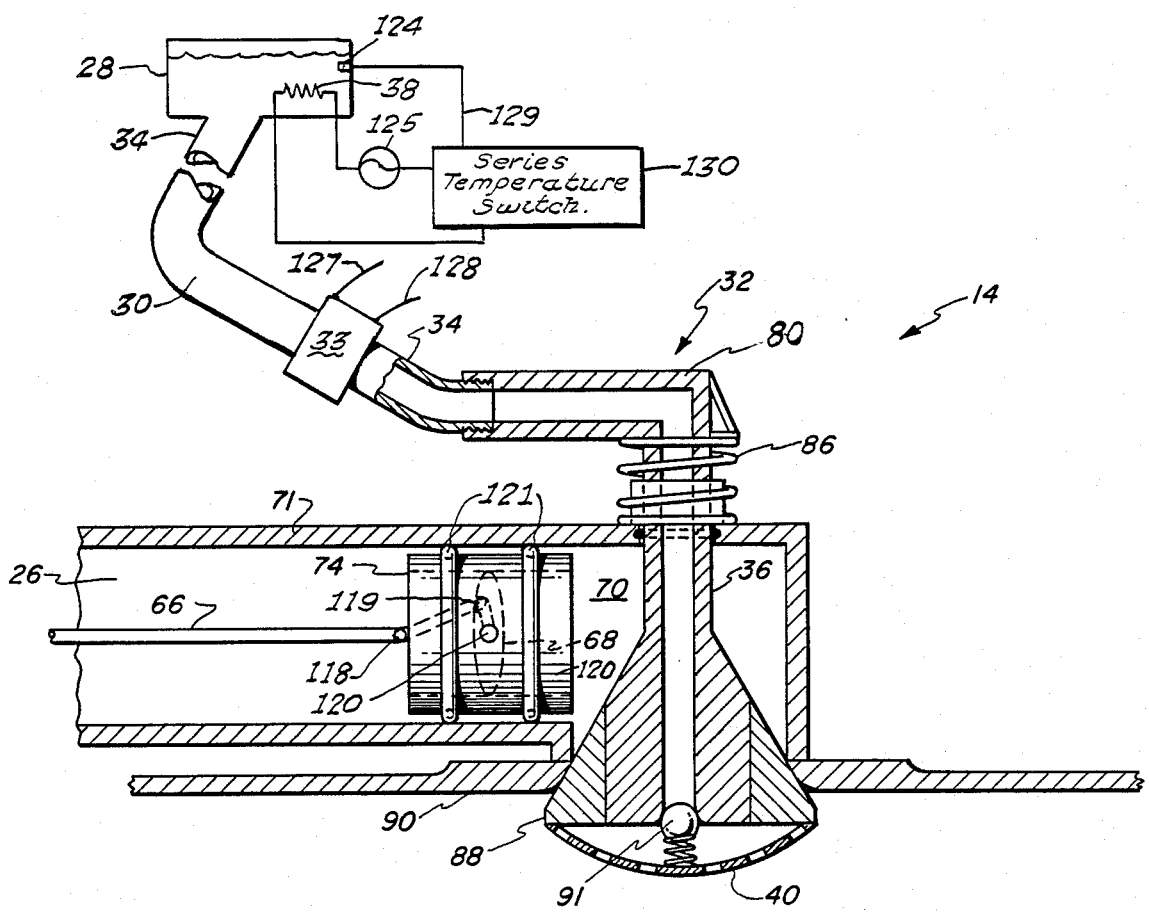
FIG. 3 is an enlarged view of the coffee dispensing mechanism.
Figure 6A:
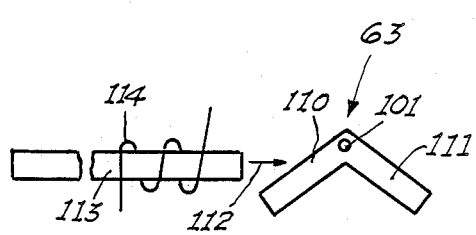
FIGS. 6a to 6d show the electromechanical camming operators of levers 63 and 76.
Figure 6B:
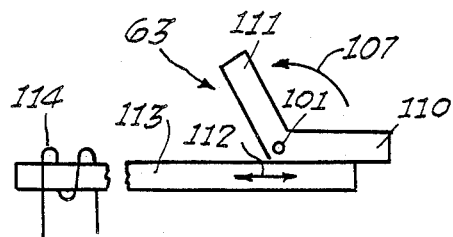
Figure 7:
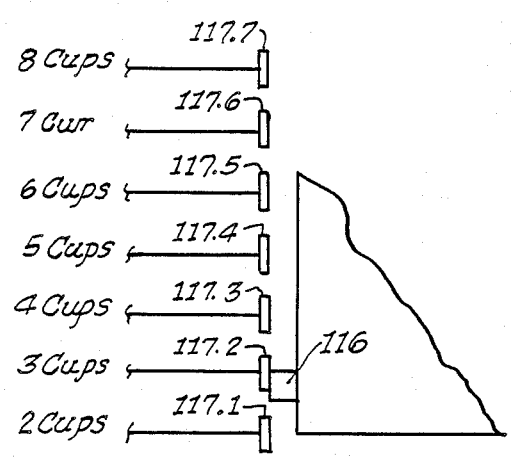
FIG. 7 is a detailed plan view of the area encircled in FIG. 2.
Figure 8:
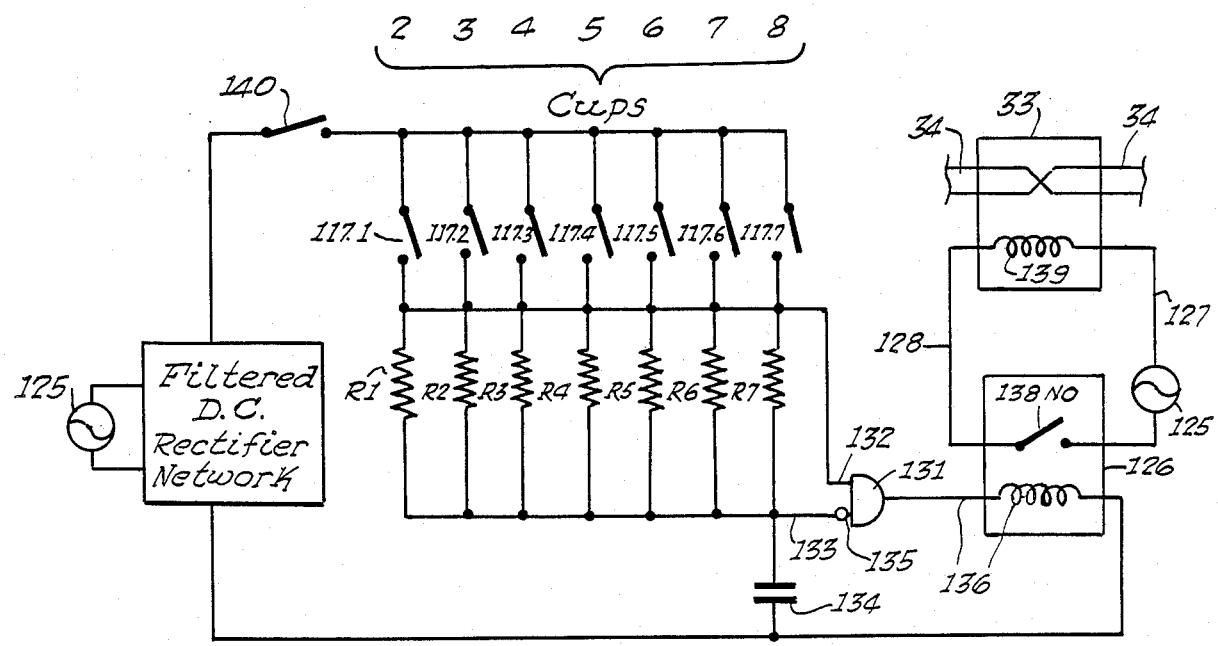
FIG. 8 is the electrical schematic of the circuit that operates valve 33.

The main selector 46 is rotated to raise or lower plunger stop 60 by a cam 104 and pin 105 mechanism. Pin 105 is mounted in housing 12 for rotation about a horizontal axis and, being joined to selector switch 46, for rotation with 46. Eccentric cam 104 is rigidly joined to pin 105 for rotation with 105 Rotation of cam 104 moves the stops 62 on top of plunger stop 60 up or down in direction 106. As 60 moves up and down, tab 116 contacts electric contacts 117.1 to 117.7 (see FIG. 7). Each contact corresponds to the "2 cups" through "8 cups" positions of 46 shown in FIG. 1. Each contact of 117.1 to 117.7 energizes a different timing circuit that serves to energize the solenoid which opens water supply valve 33 for different preselected times (e.g. time to load 34 with water for 2 cups, 3 cups, etc.) (Exemplery timing circuits are shown in FIG. 8, discussed below.) Lever 63 is automatically actuated by a solenoid operated cam (FIGS. 6a and 6b) to push the pin 64 to move control rod 66 to the left. With particular reference to FIGS. 2, 6a, and 6b, it is seen that lever 63 has two arms 110, 111 mounted on pin 101 to freely turn with respect to housing 12. A solenoid coil 114 causes solenoid plunger 113 to move back and forth in direction 112. Plunger 113 can be spring biased (not shown) in the retracted position shown in FIG. 6a so that energization of coil 114 causes plunger 113 to extend, as in FIG. 6b. As can be seen from the drawing figures, as plunger 113 extends, arms 110, 116 are rotated in the direction 107, arm 107 contacts horizontally mounted pin 64, pushing pin 64 and rod 66 in direction 109 against the force of spring 72. Control rod 66 opens butterfly valve 74 to allow coffee from supply hopper 20 into chamber 70. The operation of butterfly valve 74 is best seen in FIG. 3. Valve 74 has an outer cylinder 120 snugly fit to walls 71 by O-rings 121. Within the cylinder is a disc 68 of about the same diameter as the inner diameter of cylinder 120. Disc 68 is mounted for rotation on horizontally disposed pin 120 (the horizontal extremeties of pin 120 being fixed to 120). Thus disc 68 can rotate about its diameter on pin 120 between the vertical (as shown in FIG. 3) to the horizontal. This rotation is effected responsive to horizontal displacement of 66 through 66's double articulation at rotative pins 118 and 119. (Rod 66 is rigidly joined to pin 120.) As rod 66 moves leftwards (plunger 113 extended as in 6b), articulations 118, 119 are pulled horizontal, causing disc 68 to rotate to a horizontal disposition. As control rod 66 continues to move to the left, cylinder 120 also moves to enlarge chamber 70 in channel 71. Disc 68, being horizontally disposed, cuts through as would a knife edge, the coffee, tea, etc., to the left of cylinder 120. In other words, butterfly valve 74 moves leftwards through the coffee, etc., without appreciably moving the coffee, etc., through which 74 moves. Control rod 66 continues to move to the left until pin 64 stops on the plunger stop 60. Plunger 60 has a plurality of staggered stops 62 (each stop corresponding to 2, 3, etc., up to 8 cups, per dial 46). Stops 62 serve to stop rod 66 from further leftward movement 109 by abutting pin 64 attached to 66. Clearly, the higher up 60 moves responsive to 46, 104, 105, the shorter the distance rod 66 and butterfly valve 74 must move, and the smaller the amount of tea, coffee, etc. would be disposed to the right of valve 74. This gives the desired volume of coffee in chamber 70. Control lever 63 releases pin 64 and control rod 66 which allows spring 72 to move the control rod 66 to the right, causing butterfly valve 68 to close. Spring 72 then keeps pressure on the coffee in chamber 70. In particular, when the control timing circuit for solenoid 113, 114 disconnects power from 114, plunger 113 retracts (FIG. 6a), and lever 110, 111, being free to rotate about 101, can no longer hold pin 64 against spring 72, and spring 72 forces rod 66 rightwardly along 109, first causing articulations 118, 119 to rotate disc 68 to the vertical (i.e. closing butterfly valve 74), and then shoving valve 74 towards chamber 70. Disc 68, being vertically disposed, forces all the tea, coffee, etc. to the right of 68 into chamber 70, thus loading chamber 70 with a preselected amount of such coffee, tea, etc.

Figure 6C:
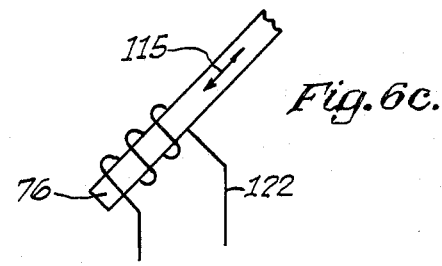
Figure 6D:
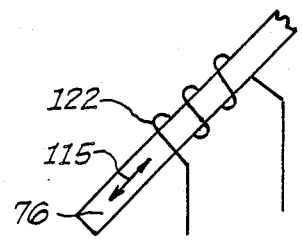

Lever 76 is thereafter moved to the right along 115 to pivot arm 78 which in turn presses down spray head tube 80. Lever 76 rests on casing 12 at 100, and slides in direction 115 using 100 as a support base. As best seen in FIGS. 6c and 6d, the left end of 76 is the plunger in a solenoid. Again, solenoid 76, 122 can be biased to the left, and moved to the right only upon coil 122 being energized.

Arm 78 is pinned for rotation at 103 to case 12, and at 102 for rotation about the distal end of 76. Thus, as 76 moves rightwardly in direction 115, lever 78 rotates counterclockwise in direction 108, forcing plunger portion 123 of lever 78 vertically downwardly against portion 80 of the water spray system, camming 36 and 80 against the force of springs 86 (best seen in FIG. 3). This creates an opening between the spray head seal 40 and the seal 88. The coffee, tea, etc., then falls through this opening onto the filter 22 in the filter hopper 84. Spring 72 continues to push the coffee in chamber 70 to the right until all the grounds are in the vertical part of chamber 70. This allows all the coffee measured in chamber 70 to fall onto the filter 22.

Lever 76 moves to the left rotating pivot arm 78 which allows spring 86 to raise spray head 40 until the seal 88 seats on the vapor shield 90. Then the heated and measured water supply is fed through feed line 34 controlled by solenoid valve 33 and a variable timer or flow measurement device connected to the selector 46 through the spray head 40 to the grounds on filter screen 22. Ball 91 includes a spring to stop the flow of water when the valve 33 closes. Brewed coffee flows through the control orifice 42 into the cup or pot.

Liquid holding tank 28 can have an electric heater 38 driven by A.C. power source 125. Temperature switch 130 can connect or disconnect power to heater 38 responsive to interlock 129 carrying sensor signals from temperature sensor 124 inside tank 28, thus keeping the liquid within 28 at a preselected temperature.

Valve 33 can be a normally closed solenoid valve controlled by such a circuit as is shown in FIG. 8. For purposes of explanation, assume switch 140 is closed (discussed below), and that a user of 10 wishes three cups of coffee, has moved dial 46 to the "3" position, connecting switch contacts 117.2. Input 132 of "and" gate 131 goes to "high" potential (from an electronic "0" to an electronic "1"). For a certain time, while capacitor 134 charges through R2, input 133 is at "0," but gate 131 interprets this as "1" because of inverter 135. Thus from the time that switch 117.2 is closed until capacitor 134 charges through R2, output 136 of gate 131 is at "1." This high potential at 136 drives coil 137 of normally open relay 126, closing relay contacts 138 to connect power source 125 to solenoid coil 139 of valve 33, thus opening valve 33 to permit liquid in tank 28 to flow to sprayer nozzle 10. When the potential across capacitor 134 (i.e. at 133) grows sufficiently large to be interpreted as a "1," (i.e., as a "0" after being inverted at 135) gate 131 is disenabled, which ultimately disenables 139, allowing valve 33 to close. This sequence is identical for all branches 117.1/R1 to 117.7/R7, the only difference being that the differing values among R1 to R7 cause valve 33 to be open differing preselected times, thus delivering differing preselected amounts of liquid.

As is manifest from the foregoing, the upshot of the circuit in FIG. 8 is that it can deliver various square pulses of pre-selected time width to enable valve 33, and those skilled in this and many other arts will know many electronic or mechanical ways to effect this.

As is also manifest from the foregoing, device 10 requires a timing cycle, in the preferred embodiment a cycle that causes levers 63 and 78, and a valve 33, to operate in the correct sequence and for the correct times. Many such timers are known, the simplest of which is the conventional rotor rotating at a constant angular velocity, and having on it a plurality of brushes that contact adjacent electrical contacts disposed about the rotor's circumference. The sequential angular placement of each contact would correspond to the sequence in which each component is enabled by the rotor brushes, and the angular length of each contact the times that each component is enabled. Thus the brushes of such a cycling rotor for device 10 would make contacts that turn on and off solenoid coils 114 and 122 for levers 63 and 76 at the proper time and close contact 140 to connect power to the circuit of FIG. 8 (i.e. to connect power after coffee is loaded into basket 84 by butterfly valve 74).

The filter hopper 84 is easily removed by sliding it out by pulling on handle 92. The reuseable filter 22 is removable by pulling ring 94 connected to link 96.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. A beverage brewing apparatus comprising:
   a housing,
   a filter means connected to said housing,
   a beverage making material holding means connected to said housing,
   a beverage making material quantity selector and transfer means for automatically measuring and transferring a selected quantity of beverage making material from said material holding means to said filter means, said selector and means connected between said material holding means and said filter means for transferring beverage making material to said filter means,
   a liquid holding means connected to said housing,
   a heating means connected to said housing,
   a liquid quantity selector, heater and transfer means for automatically measuring, heating and transferring a selected quantity of liquid from said liquid holding means to said beverage making material in said filter means, said liquid selector, heating and transfer means connected between said liquid holding means and said filter, said liquid transfer means including means so constructed and arranged and so structurally interrelated with said beverage making material transfer means for effectively controlling the amount of beverage making material conveyed from said holding means to said filter means, and
   an outlet means connected to said housing and adjacent said filter means to direct the brewed liquid after passing through said filter into a cup or pot.

2. A beverage brewing apparatus as set forth in claim 1, wherein:
   said beverage making material quantity selector and transfer means includes a dispensing means,
   said liquid quantity selector, heating and transfer means is the dispensing means of said beverage making material quantity selector and transfer means.

3. A beverage brewing apparatus as recited in claim 1 wherein said beverage material holding means includes a chamber for receiving a preselected quantity of said beverage making material, said chamber having a discharge outlet and said transfer means including valve means coacting with said chamber discharge outlet.

4. A beverage brewing apparatus as recited in claim 1 wherein said material transfer means includes said liquid transfer means.

* * * * *

UNITED STATES PATENT AND TRADEMARK OFFICE
CERTIFICATE OF CORRECTION

PATENT NO. : 4,608,916
DATED : September 2, 1986
INVENTOR(S) : Becker, et al.

It is certified that error appears in the above—identified patent and that said Letters Patent is hereby corrected as shown below:

Column 4, line 63, "nozzle 10" should be --nozzle 40--.

Signed and Sealed this

Twenty-third Day of December, 1986

Attest:

DONALD J. QUIGG

Attesting Officer     Commissioner of Patents and Trademarks